United States Patent
Silvestro

(10) Patent No.: US 6,693,399 B2
(45) Date of Patent: Feb. 17, 2004

(54) SERVO-CONTROL DEVICES, IN PARTICULAR FOR AN AIRCRAFT FLIGHT CONTROL ACTUATOR

(75) Inventor: Geneviève Silvestro, Eragny (FR)

(73) Assignee: TRW Systemes Aeronautiques Civils, L'Aumone (FR)

( * ) Notice: Subject to any disclaimer, the term of this patent is extended or adjusted under 35 U.S.C. 154(b) by 0 days.

(21) Appl. No.: 09/884,176

(22) Filed: Jun. 18, 2001

(65) Prior Publication Data

US 2002/0038841 A1 Apr. 4, 2002

(30) Foreign Application Priority Data

Jun. 19, 2000 (FR) ............................................. 00 07795

(51) Int. Cl.$^7$ ................................................. G05D 3/12
(52) U.S. Cl. ........................ 318/566; 318/615; 318/632
(58) Field of Search ................................. 318/566, 584, 318/585, 586, 621, 632, 646, 615

(56) References Cited

U.S. PATENT DOCUMENTS

| | | | | |
|---|---|---|---|---|
| 4,079,906 A | * | 3/1978 | Durandeau et al. | |
| 4,089,494 A | * | 5/1978 | Anderson et al. | ........ 318/628 X |
| 4,195,337 A | * | 3/1980 | Bertrand et al. | ........ 318/561 X |
| 4,492,907 A | * | 1/1985 | Fabian et al. | ............... 318/586 |
| 4,527,242 A | * | 7/1985 | McElreath et al. | ..... 244/196 X |
| 4,849,900 A | * | 7/1989 | Blight et al. | |
| 4,992,713 A | * | 2/1991 | McCollum et al. | ......... 318/586 |
| 5,117,170 A | | 5/1992 | Keane et al. | |
| 5,136,227 A | | 8/1992 | Nakano et al. | |
| 5,233,512 A | * | 8/1993 | Gutz et al. | |
| 5,291,113 A | * | 3/1994 | Hegg et al. | .................. 318/584 |
| 5,552,690 A | * | 9/1996 | Hiraoka | ...................... 318/632 |
| 5,862,894 A | * | 1/1999 | Boichot et al. | |

FOREIGN PATENT DOCUMENTS

| EP | 0 897111 | 2/1999 |
|---|---|---|
| FR | 2 660 705 | 10/1991 |

* cited by examiner

Primary Examiner—Bentsu Ro
(74) Attorney, Agent, or Firm—Blakely, Sokoloff, Taylor & Zafman

(57) ABSTRACT

The invention relates to a servo-control device comprising at least one servo-control loop which receives a servo-control signal as input and whose output acts on an element to be servo-controlled, said device comprising means for determining a parameter characterizing the real force generated by the servo-control, the device also including a loop having means for determining an error characteristic of the difference between said parameter characterizing the real force and a parameter characterizing an acceptable theoretical force which is a function of the servo-control signal, and also means for correcting the processing of the servo-control loop as a function of said error. The means for determining the error make use of a reference model which is advantageously a transfer function relating force to a flow rate control signal.

8 Claims, 2 Drawing Sheets

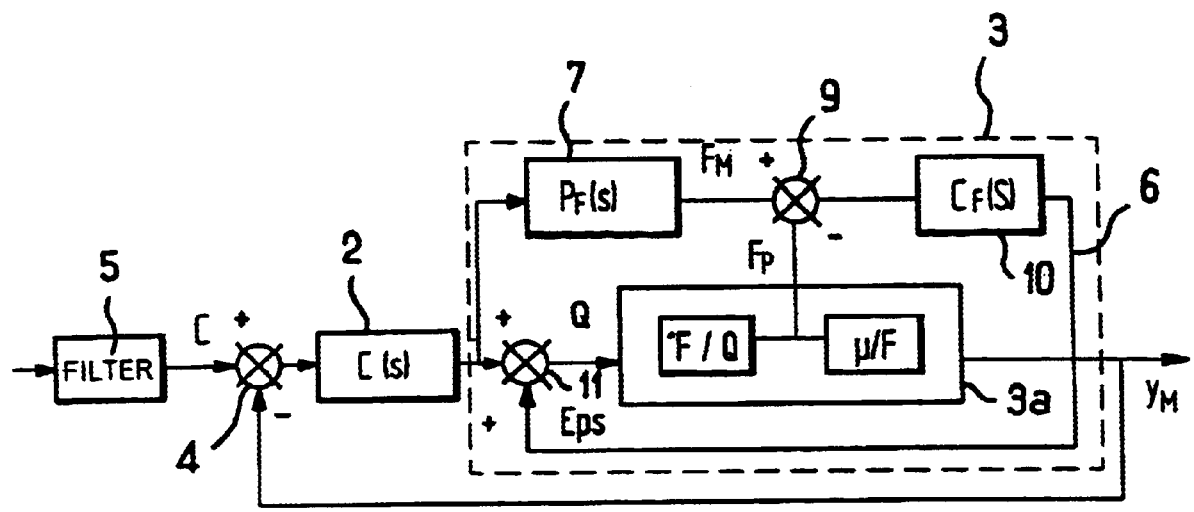
FIG_1
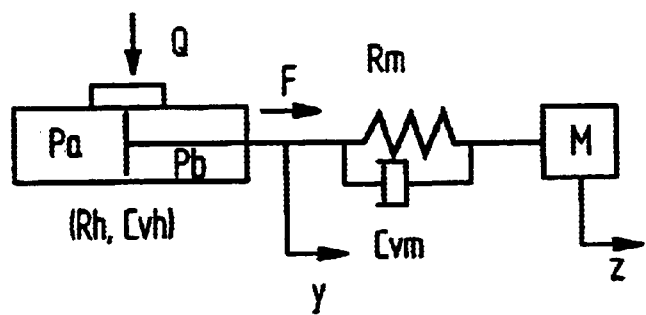
FIG_2

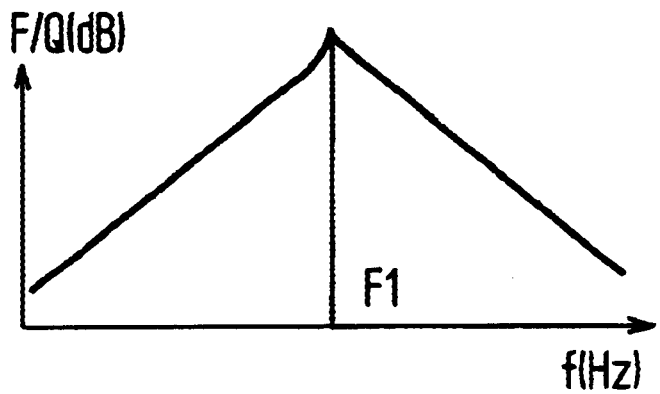
FIG_3a
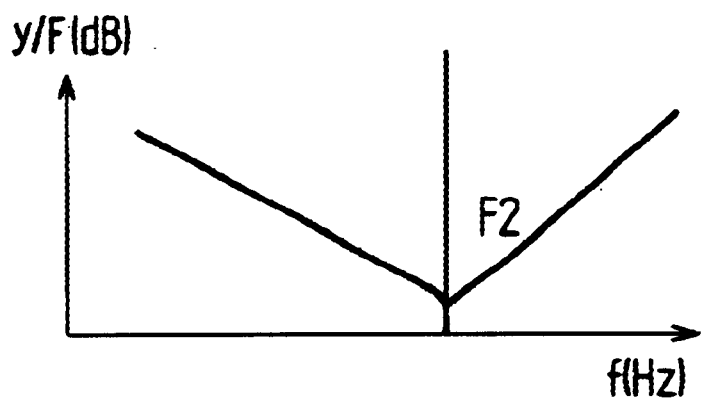
FIG_3b
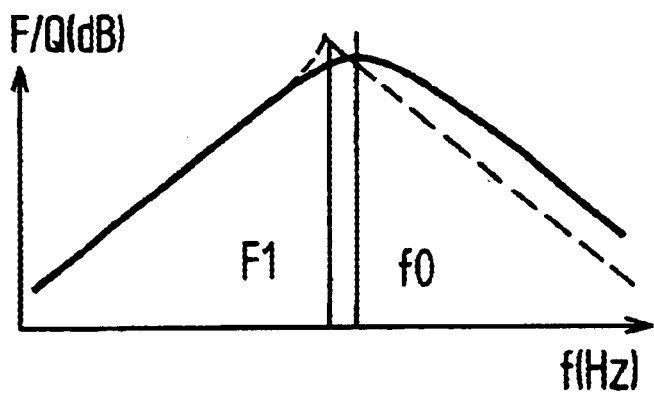
FIG_3c

12
SERVO-CONTROL DEVICES, IN PARTICULAR FOR AN AIRCRAFT FLIGHT CONTROL ACTUATOR

The present invention relates to servo-control devices, in particular for an aircraft flight control actuator.

A preferred application lies with devices for servo-controlling position.

The invention is also advantageously applicable to devices for servo-controlling force.

BACKGROUND OF THE INVENTION

Conventionally, a position servo-control device for a flight control actuator comprises a servo-control loop which includes compensation means disposed in the loop upstream from the servo-controlled system and performing filtering, in particular at resonant frequencies for movements of the mechanical part(s) actuated by said system.

A problem encountered with such a servo-control device lies in that no account is taken of the forces which act on the mechanical parts being actuated.

Unfortunately, these forces can be particularly large.

In various technical fields, in particular in fields very distant from aircraft flight control actuators, various servo-controlled systems have been proposed for improving control of the force exerted on the mechanical parts that are actuated.

Document EP 0 897 111 discloses a mechanical test machine comprising a servo-control device making it possible to control a load exerted on a sample of material under test. The servo-control device has means for determining an error that is characteristic of the difference between the theoretical reference force and a variable that depends on the real applied maximum and minimum forces.

Document U.S. Pat. No. 5,117,170 describes an exercise machine comprising a servo-controlled motor-driven device serving to simulate a load. In that device, the control signal for the motor depends on the position of the rotor and it cannot exceed a maximum value.

Document U.S. Pat. No. 5,136,227 proposes a servo-controlled device for compensating the effect of gravity on the arm of a robot. That device has means for determining an error characteristic of the difference between the real torque applied and a theoretical torque due to gravity.

Document FR 2 660 705 describes a device for servo-controlling the force exerted on the piston of a hydraulic actuator. That device comprises a servo-control loop that takes account of an error which is characteristic of the difference between the real force applied and a reference force, and an additional loop that takes the speed of the piston into account.

Those various devices do not make it possible to take account of the strength of the mechanical part on which the forces act.

Consequently, it is desirable to provide better control of such forces in order to limit the fatigue of mechanical parts and to increase their lifetime.

OBJECTS AND SUMMARY OF THE INVENTION

An object of the invention is to provide a position servo-control device of this kind which is particularly simple and reliable.

To this end, the invention provides a servo-control device comprising at least one servo-control loop which receives a servo-control signal as input and whose output acts on an element to be servo-controlled, said device comprising means for determining a parameter characterizing the real force generated by the servo-control, the device also including a loop having means for determining an error characteristic of the difference between said parameter characterizing the real force and a parameter characterizing an acceptable theoretical force which is a function of the servo-control signal, and also means for correcting the processing of the servo-control loop as a function of said error.

Such a device, which can be a position servo-control device, or a force servo-control device, presents the advantage of providing very high performance force control.

The device is advantageously associated with the various following characteristics taken singly or in any technically feasible combination:

- the means for determining the error comprise determination means for determining a parameter characterizing the acceptable theoretical force on the basis of a reference model;
- an actuator controlled by the servo-control loop is of the hydraulic type and the reference model is a force/signal transfer function for controlling flow rate;
- the determination means comprise means for implementing a transfer function having the same appearance as a transfer function for determining the parameter characterizing the real force, except in the vicinity of at least one resonant frequency of said force;
- said transfer function is:

$$\frac{F_{ref}}{Q_{ref}} = \frac{ks}{\left(\frac{1}{2\pi f_0}\right)^2 s^2 + 2\chi \frac{X}{2\pi f_0} s + 1} \cdot B(s)$$

where s represents the Laplacian, and where f0 is equal to or close to a resonant frequency, $\chi$ being an attenuation factor having magnitude of about 0.7 to 1, k being a gain factor, B(s) being a filter function; and
- the function B(s) is equal to 1.

The invention also advantageously provides a hydraulic servo-control device constituted by a device of the above-specified type.

The invention also provides a servo-control device for a flight control actuator or a test actuator, the device being constituted by a device of the above-specified type.

BRIEF DESCRIPTION OF THE DRAWINGS

Other characteristics and advantages of the invention appear further from the following description which is purely illustrative and non-limiting and which should be read with reference to the accompanying drawings, in which:

FIG. 1 is a block diagram of a device constituting a possible embodiment of the invention;

FIG. 2 is a diagram of a hydraulic servo-control actuator; and

FIGS. 3a to 3c are three graphs showing different transfer functions that can be used with a device of the type shown in FIG. 1.

MORE DETAILED DESCRIPTION

The device shown in FIG. 1 comprises a servo-control loop 1 which has a servo-controlled system 3, and compensation means 2 which are disposed in the loop upstream from the servo-controlled system 3.

Subtracter means at the inlet of the loop receive a control signal C and subtract therefrom a signal "$y_M$" output by the loop so as to generate an error signal, said means being referenced 4. (The signal "$y_M$" is a signal characteristic of the controlled position or force, whereas the signal C is a signal of the same nature characterizing the reference position or force.)

FIG. 1 also shows a filter 5 whose input receives an unfiltered control signal and which outputs the signal C.

The compensation means 2 receive the error signal output by the subtracter means 4 and apply filtering thereto, amongst other things at frequencies which are resonant frequencies for movements of the mechanical parts controlled by the actuator (transfer function C(s)).

In addition to an actuator 3a which acts mechanically on the part(s) to be controlled (a hydraulic actuator for flight control or for a test bench, for example), the servo-controlled system 3 also includes a loop 6 which calculates the difference between a real force $F_p$ corresponding to the signal $y_M$ output by the loop 3 and an authorized force $F_M$ which is determined as a function of the signal Cr output by the compensation means 2.

In FIG. 1, the module for determining the authorized mechanical $F_M$ is referenced 7.

It implements a transfer function $P_F(s)$ which is a model of the expected force behavior, e.g. in the form of a linear Laplace representation.

This model is selected to correspond substantially to the real force behavior of the servo-control in the absence of the loop 6, significantly modified to avoid or limit mechanical force resonances.

In FIG. 1, the subtracter means of the loop 6 are referenced 9. The output signal from these subtracter means 9 can be subject where appropriate to compensation treatment (module 10 whose transfer function $C_F(s)$ can be a simple gain function, for example), the correction signal $EPS_r$ output from this processing being added to the signal Cr (means 11).

The resulting correct signal Q (for hydraulic servo-control, Q is a flow rate control signal), is injected as an input to the actuator 3a.

The real force $F_p$ can be determined by a pressure sensor provided for this purpose.

In a variant, as shown in FIG. 1, the actuator 3a can comprise two modules implementing two successive transfer functions F/Q and then Y/F, the signal characteristic of the real force $F_p$ being the signal output from the module corresponding to the first transfer function F/Q.

The loop 6 made in this way serves to stabilize the force behavior generated by the servo-control.

It also serves to make the servo-control perform better.

There follows a description of examples of transfer functions that can be used for position servo-control, in particular for $P_F(s)$, F/Q, and Y/F.

An actuator or servo-control can be represented diagrammatically as shown in FIG. 2 by a hydraulic stiffness Rh, a hydraulic damping coefficient Cvh, a surface area S, a flow rate Q (e.g. controlled by means of an electrical input), pressures Pa and Pb in two respective hydraulic chambers, and with the assembly being loaded by a mass M via a stiffness Rm and a mechanical damping coefficient Cvm.

The Laplace equation on the load can then be written:

$$mzs^2 = (R_m + C_{vm}s)(y-z) = F \quad [1]$$

with the Laplacian being written s, the displacement of the actuator rod is written y, that of the mass M z, and the force generated by the actuator being written F.

The equations governing the expression for pressures in the chambers of a symmetrical actuator filled with fluid are themselves known (see for example "Commande et asservissement hydraulique et électrohydrauliques" [Hydraulic and electro-hydraulic control and servo-control] by Marcel Guillon, published by Editions Tec&Doc 1992).

In particular, the Laplace equation relating flow rate, force, and displacement is written as follows:

$$\frac{Q}{S}\left(1 + \frac{C_{vh}}{R_h}s\right) = s\left(y + \frac{C_{vh}}{R_h}sy + \frac{1}{R_h}F\right) \quad [2]$$

or indeed $$F = (R_h + C_{vh}s)\left(\frac{Q}{Ss} - y\right) \quad [3]$$

Combining these three equations gives:

$$y = F \cdot \frac{R_m + C_{vm}s + Ms^2}{(R_m + C_{vm}s)Ms^2} \quad [4]$$

Equation [2] can then be expressed as a function of [4] as follows:

$$\frac{F}{Q} = \frac{R_h + C_{vh}s}{Ss\left(1 + \frac{R_m + C_{vm}s + Ms^2}{R_{m+C_{vm}s)Ms^2}}(R_h + C_{vh}s)\right)} \quad [5]$$

$$\frac{F}{Q} = \frac{(R_h + C_{vh}s)(R_m + C_{vm}s)Ms^2}{Ss(C_{vh} + C_{vm})Ms^3 + (M(R_h + R_m) + C_{vh}C_{vm})s^2 + (R_hC_{vm} + R_mC_{vh})s + R_hR_m)} \quad [6]$$

$$\frac{F}{Q} = \frac{Ms(R_hR_m + (R_hC_{vm} + R_mC_{vh})s + C_{vh}C_{vm}s^2)}{S(R_hR_m + (R_hC_{vm} + R_mC_{vh})s + (C_{vh}C_{vm} + M(R_m + R_h))s^2 + M(C_{vh} + C_{vm})s^3)} \quad [7]$$

The position or force transfer y/Q can thus be resolved as a first transfer function F/Q given by [7] followed by a second equation y/F whose transfer function is given by [4], position servo-control being performed on the complete system at y/Q.

It should be observed that the expression for F/Q has a derivative term in the numerator and a resonance given by the preponderant terms in the denominator of frequency $$\frac{1}{2\pi}\sqrt{\frac{R_hR_m}{M(R_h + R_m)}}.$$

This is practically the appearance of F/Q which therefore has the shape shown in FIG. 3a.

The resonance leads to peaks where force is very high, particularly whenever there is a change of control sign.

Position transfer y/F has the appearance shown in FIG. 3b, with a drop of gain at frequency F2 given mainly by $$\frac{1}{2\pi}\sqrt{\frac{R_m}{M}}$$

and prevents no particular control problem. The ratio between the frequencies F1 and F2 is $$\sqrt{\frac{R_h}{R_h + R_m}}$$

and F1 is always smaller than F2.

A model for use in the force control loop 6 can be deduced from knowledge of the linear transfer function F/Q.

The transfer function $P_F(s)$ corresponding to this model can be selected so as to correspond to F/Q at very low frequencies and eliminate as much as possible the resonance around F1.

In particular, by using a transfer function $P_F(s)$ of appearance that is the same as that of the theoretical transfer function F/Q except in the immediate vicinity of F1, it is possible to obtain results that are very robust, significantly reducing the force of the servo-control or the actuator at transitions.

An example of the transfer function for this reference model can be as follows:

$$\frac{F_{ref}}{Q_{ref}} = \frac{ks}{\left(\frac{1}{2\pi f_0}\right)^2 s^2 + 2x\frac{X}{2\pi f_0}s + 1} \cdot B(s)$$

This transfer function is shown in FIG. 3c where it is superposed on the transfer function of FIG. 3a (dashed line) and it is obtained on the basis of a priori knowledge concerning the structure of F/Q, specifically a pure derivative term in the numerator, and a second order of natural angular frequency f0 which is not necessarily exactly equal to F1 (for example, an error of 20% relative to F1 is completely acceptable, with a damping factor $\chi$ which, for example, can be of magnitude lying in the range 0.7 to 1 and which serves to eliminate the overload). In the above equation, B(s) represents a filter term which in simplified form can be taken to be equal to 1; k is a gain term which corresponds to the transfer function $C_F(s)$.

Naturally, other types of reference model could be used. Nevertheless, those given above present the advantage of being efficient, simple to use, and robust.

It should also be observed that the reference model described above can also advantageously be used when servo-controlling force.

Also, it will be observed that the devices proposed by the invention can advantageously be used in servo-control devices having a plurality of servo-control loops in parallel.

In particular, the invention is easily implemented on conventional servo-control devices in which the various servo-control loops are synchronized by means of force measurements.

It should also be observed that one of the major advantages of the invention lies in that it enables operation of the main servo-control loop (loop 1 in FIG. 1) to continue even if the correction loop for taking force into account (loop 6 in FIG. 1) should fail.

What is claimed is:

1. A servo-control device comprising:
   at least a first servo-control loop which receives a servo-control signal as input and whose output acts on an element to be servo-controlled;
   means for determining a parameter measuring the real force generated by the servo-control;
   another loop having means for determining an error which is the difference between said parameter measuring the real force and a parameter estimating an acceptable theoretical force which is a function of the servo-control signal; and
   means for correcting the processing of the servo-control loop as a function of said error;
   wherein the means for determining the error comprise determination means for determining a parameter estimating the acceptable theoretical force on the basis of a reference model, the determination means comprising means for implementing a transfer function having the same appearance as a transfer function or determining the parameter measuring the real force, except in the vicinity of at least one resonant frequency of said force.

2. A device according to claim 1, wherein an actuator controlled by the first servo-control loop is hydraulic and the reference model is a force/signal transfer function for controlling flow rate.

3. A device according to claim 2, wherein the determination means comprise means for implementing a transfer function having the same appearance as a transfer function for determining the parameter measuring the real force, except in the vicinity of at least one resonant frequency of said force, and wherein said transfer function is:

$$\frac{F_{ref}}{Q_{ref}} = \frac{ks}{\left(\frac{1}{2\pi f_0}\right)^2 s^2 + 2x\frac{X}{2\pi f_0}s + 1} \cdot B(s)$$

where s represents the Laplacian, and where $f_0$ is equal to or close to a resonant frequency, x being an attenuation factor having magnitude of about 0.7 to 1, k being a gain factor, B(s) being a filter function.

4. A device according to claim 3, wherein the function B(s) is equal to 1.

5. A position servo-control device, constituted by a device according to claim 1.

6. A force servo-control device, constituted by a device according to claim 1.

7. A hydraulic servo-control device, constituted by the device according to claim 1.

8. A servo-control device for actuating a flight control or a test actuator, the device being constituted by a device according to claim 1.

* * * * *

UNITED STATES PATENT AND TRADEMARK OFFICE
CERTIFICATE OF CORRECTION

PATENT NO. : 6,693,399 B2
DATED : February 17, 2004
INVENTOR(S) : Silvestro

It is certified that error appears in the above-identified patent and that said Letters Patent is hereby corrected as shown below:

Column 6,
Line 26, please delete "or" and insert -- for --.

Signed and Sealed this

Eighth Day of June, 2004

JON W. DUDAS
*Acting Director of the United States Patent and Trademark Office*